United States Patent
Sedin et al.

(10) Patent No.: US 11,979,222 B2
(45) Date of Patent: May 7, 2024

(54) SYSTEMS AND METHODS FOR TIMING ADAPTATION FOR SATELLITE COMMUNICATIONS

(71) Applicant: Telefonaktiebolaget LM Ericsson (publ), Stockholm (SE)

(72) Inventors: Jonas Sedin, Sollentuna (SE); Björn Hofström, Linköping (SE); Xingqin Lin, Santa Clara, CA (US); Helka-Liina Määttänen, Helsinki (FI); Siva Muruganathan, Stittsville (CA); Hazhir Shokri Razaghi, Solna (SE); Zhenhua Zou, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 523 days.

(21) Appl. No.: 17/280,304

(22) PCT Filed: Sep. 19, 2019

(86) PCT No.: PCT/IB2019/057946
§ 371 (c)(1),
(2) Date: Mar. 26, 2021

(87) PCT Pub. No.: WO2020/065469
PCT Pub. Date: Apr. 2, 2020

(65) Prior Publication Data
US 2022/0006514 A1 Jan. 6, 2022

Related U.S. Application Data

(60) Provisional application No. 62/737,468, filed on Sep. 27, 2018.

(51) Int. Cl.
*H04B 7/185* (2006.01)
*H04L 1/1867* (2023.01)
*H04W 74/0833* (2024.01)

(52) U.S. Cl.
CPC ....... *H04B 7/18528* (2013.01); *H04L 1/1883* (2013.01); *H04W 74/0833* (2013.01)

(58) Field of Classification Search
CPC ............ H04B 7/18528; H04B 7/18508; H04L 1/1883; H04W 74/0833
(Continued)

(56) References Cited

U.S. PATENT DOCUMENTS 3,922,496 A * 11/1975 Gabbard .............. H04B 7/2126
370/324
5,790,939 A * 8/1998 Malcolm ............ H04B 7/18513
370/324
(Continued)

FOREIGN PATENT DOCUMENTS

EP 0748065 A2 12/1996
EP 2827660 A1 1/2015
(Continued)

OTHER PUBLICATIONS

Author Unknown, "Technical Specification Group Radio Access Network; Study on New Radio (NR) to support non terrestrial networks (Release 15)," Technical Report 38.811, Version 1.0.0, 3GPP Organizational Partners, Jun. 2018, 136 pages.
(Continued)

*Primary Examiner* — Amancio Gonzalez
(74) *Attorney, Agent, or Firm* — Withrow & Terranova, PLLC

(57) ABSTRACT

Systems and methods for adapting a timer(s) for a satellite-based radio access network are disclosed. Embodiments of a method performed by a wireless device and corresponding embodiments of a wireless device are disclosed. In some embodiments, a method performed by a wireless device comprises obtaining a value to be used to offset, extend, and/or scale one or more timers related to the satellite-based
(Continued)

radio access network relative to values for non-satellite-based radio access networks. The method further comprises utilizing the value to offset a start of one or more timers, extend one or more timers, and/or scale one or more timers and performing one or more actions based on the one or more offset timers, the one or more extended timers, and/or the one or more scaled timers. Embodiments of a method performed by a base station and corresponding embodiments of a base station are also disclosed.

25 Claims, 14 Drawing Sheets

(58) Field of Classification Search
USPC .......................................................... 370/316
See application file for complete search history.

(56) References Cited

U.S. PATENT DOCUMENTS

| | | | | |
|---|---|---|---|---|
| 5,914,686 | A * | 6/1999 | Schipper | G01S 19/42 701/493 |
| 6,108,317 | A * | 8/2000 | Jones | H04J 13/10 375/150 |
| 6,285,316 | B1 * | 9/2001 | Nir | G01S 1/68 701/470 |
| 6,356,740 | B1 * | 3/2002 | Malcolm | H03J 7/02 455/12.1 |
| 6,542,820 | B2 * | 4/2003 | LaMance | G01S 19/27 342/357.42 |
| 6,985,542 | B1 * | 1/2006 | Nir | G01S 19/46 375/343 |
| 7,027,773 | B1 * | 4/2006 | McMillin | H04L 45/00 455/445 |
| 7,653,394 | B2 * | 1/2010 | McMillin | H04W 88/04 370/331 |
| 8,019,012 | B2 * | 9/2011 | Yellapantula | H04B 7/0671 375/267 |
| 8,599,706 | B2 | 12/2013 | Damnjanovic et al. | |
| 9,185,530 | B2 * | 11/2015 | Gomes | H04W 4/70 |
| 9,210,664 | B2 | 12/2015 | Dinan | |
| 9,225,566 | B2 * | 12/2015 | Muppirisetty | H04L 27/0014 |
| 9,614,577 | B2 * | 4/2017 | Dzung | H02H 3/28 |
| 9,798,017 | B2 * | 10/2017 | Zhodzishsky | G01S 19/44 |
| 9,820,244 | B2 | 11/2017 | Earnshaw et al. | |
| 9,973,264 | B2 * | 5/2018 | Vasavada | H04W 56/00 |
| 9,994,316 | B1 * | 6/2018 | Navot | G01C 21/005 |
| 10,440,598 | B2 * | 10/2019 | Chu | G01S 5/021 |
| 10,764,855 | B1 * | 9/2020 | Chu | H04W 56/0045 |
| 10,775,513 | B1 * | 9/2020 | Averin | G01S 19/55 |
| 11,363,643 | B2 | 6/2022 | Lin et al. | |
| 11,573,328 | B2 * | 2/2023 | Henkel | G01S 19/073 |
| 11,689,403 | B2 * | 6/2023 | Noh | H04L 1/1671 370/329 |
| 2006/0245398 | A1 | 11/2006 | Li et al. | |
| 2011/0207472 | A1 * | 8/2011 | Abraham | A47G 33/00 455/456.1 |
| 2013/0258862 | A1 | 10/2013 | Dinan | |
| 2013/0272229 | A1 | 10/2013 | Dinan | |
| 2014/0044108 | A1 | 2/2014 | Earnshaw et al. | |
| 2014/0301262 | A1 * | 10/2014 | Homchaudhuri | H04W 52/0216 370/311 |
| 2015/0270890 | A1 * | 9/2015 | Vasavada | H04B 7/195 370/326 |
| 2016/0224053 | A1 * | 8/2016 | Koramutla | G06F 9/4825 |
| 2016/0380736 | A1 | 12/2016 | Ahn et al. | |
| 2017/0135134 | A1 | 5/2017 | Rune et al. | |
| 2019/0159149 | A1 | 5/2019 | Ryu et al. | |
| 2021/0243807 | A1 * | 8/2021 | Hooli | H04L 47/76 |

FOREIGN PATENT DOCUMENTS

| | | |
|---|---|---|
| WO | 2012106798 A1 | 8/2012 |
| WO | 2016057195 A1 | 4/2016 |
| WO | 2019103833 A1 | 5/2019 |
| WO | 2019161044 A1 | 8/2019 |
| WO | 2020031120 A2 | 2/2020 |

OTHER PUBLICATIONS

Guidotti, A. et al., "Architectures and Key Technical Challenges for 5G Systems Incorporating Satellites," arXiv:1806.02088v1 [cs.NI], Jun. 6, 2018, 18 pages.
Nomor Research GMBH et al., "R2-1813615: Considerations on MAC Control Loops and Timings in Non-Terrestrial Networks (NTN)," Third Generation Partnership Project (3GPP), TSG-RAN WG2 Meeting #103-Bis, Oct. 8-12, 2018, Chengdu, China, 6 pages.
Nomor Research GMBH et al., "R2-1813617: Considerations on PDCP Control Loops and Timings in Non-Terrestrial Networks (NTN)," Third Generation Partnership Project (3GPP), TSG-RAN WG2 Meeting #103-Bis, Oct. 8-12, 2018, Chengdu, China, 3 pages.
Samsung, "R1-1804395: Considerations on random access for NTN," Third Generation Partnership Project (3GPP), TSG RAN WG1 Meeting #92b, Apr. 16-20, 2018, Sanya, China, 4 pages.
Thales, "RP-181370: Study on solutions evaluation for NR to support Non Terrestrial Network," Third Generation Partnership Project (3GPP), TSG RAN meeting #80, Jun. 11-14, 2018, 5 pages, La Jolla, USA.
Invitation to Pay Additional Fees and Partial Search for International Patent Application No. PCT/IB2019/056739, dated Nov. 29, 2019, 13 pages.
International Search Report and Written Opinion for International Patent Application No. PCT/IB2019/056739, dated Feb. 5, 2020, 18 pages.
International Search Report and Written Opinion for International Patent Application No. PCT/IB2019/057946, dated Nov. 25, 2019, 19 pages.
Non-Final Office Action for U.S. Appl. No. 17/267,546, dated Oct. 7, 2021, 14 pages.
Non-Final Office Action for U.S. Appl. No. 17/838,576, dated Jun. 9, 2023, 22 pages.
Examination Report for European Patent Application No. 19779565.1, dated May 16, 2023, 6 pages.
Examination Report for Indian Patent Application No. 202117005896, dated Jan. 28, 2022, 13 pages.
Notice of Allowance for U.S. Appl. No. 17/267,546, dated Feb. 18, 2022, 6 pages.
Final Office Action for U.S. Appl. No. 17/838,576, dated Oct. 16, 2023, 18 pages.
First Office Action for Chinese Patent Application No. 201980066948.8, dated Sep. 28, 2023, 13 pages.

* cited by examiner

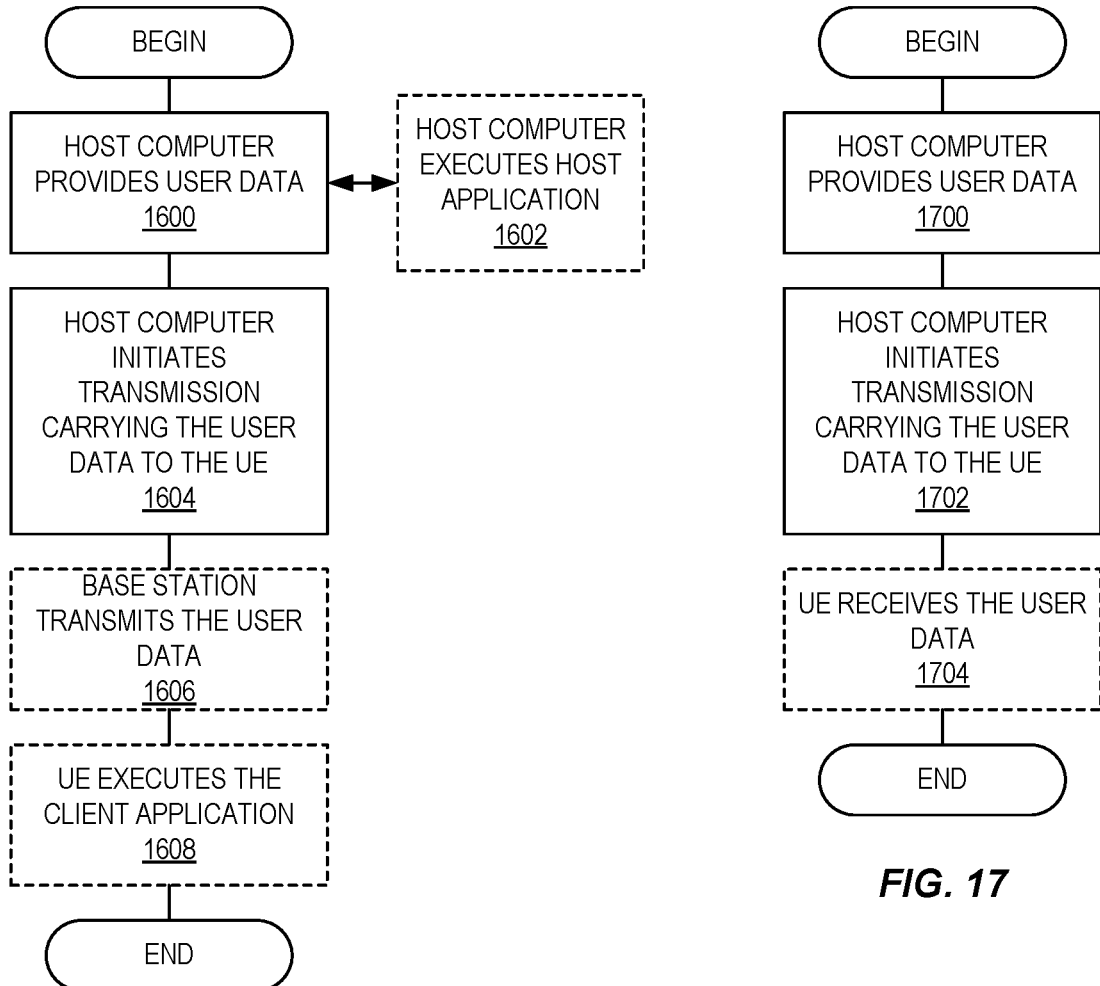

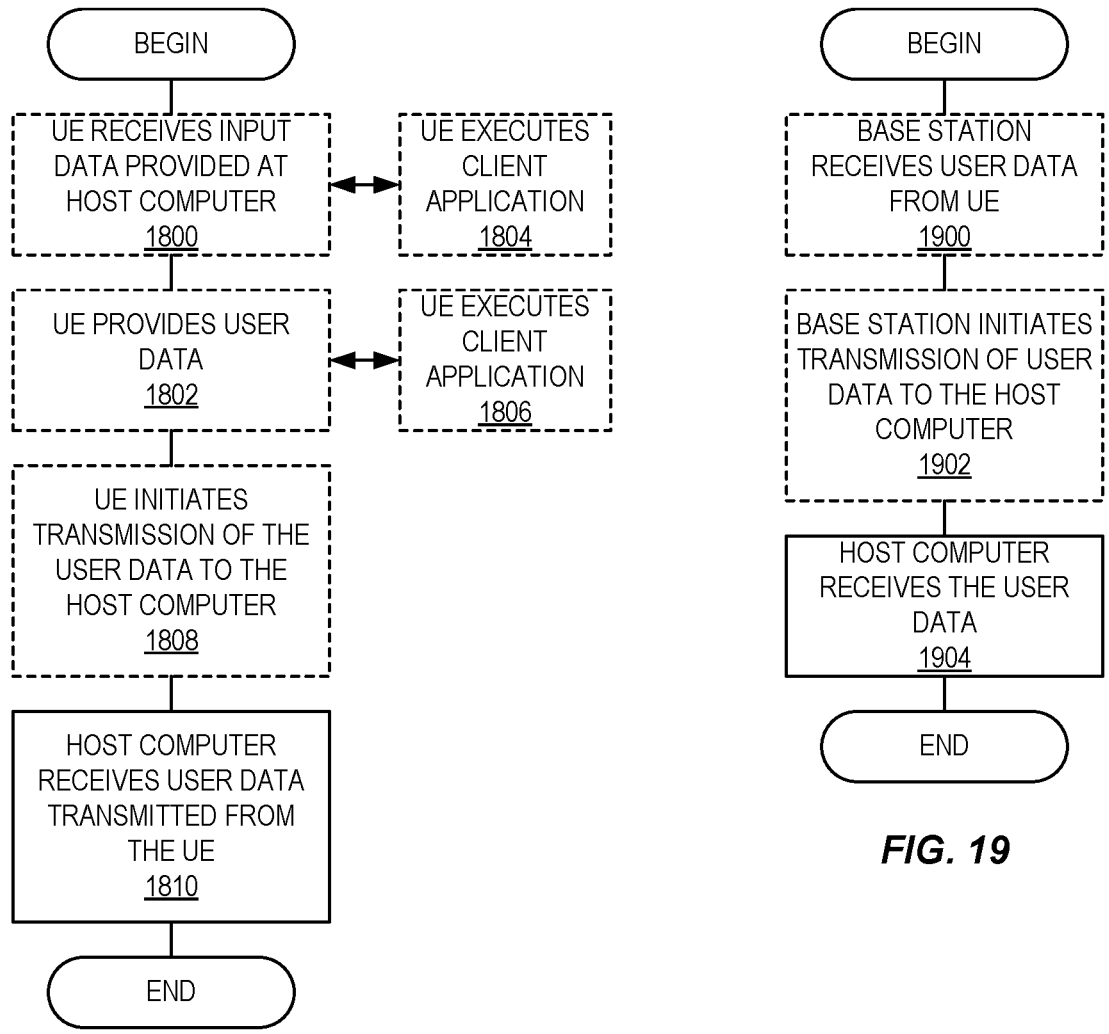

SYSTEMS AND METHODS FOR TIMING ADAPTATION FOR SATELLITE COMMUNICATIONS

RELATED APPLICATIONS

This application is a 35 U.S.C. § 371 national phase filing of International Application No. PCT/IB2019/057946, filed Sep. 19, 2019, which claims the benefit of provisional patent application Ser. No. 62/737,468, filed Sep. 27, 2018, the disclosures of which are hereby incorporated herein by reference in it entirety their entireties.

TECHNICAL FIELD

The present disclosure relates to a satellite-based radio access network for a cellular communications system and, more specifically, to various timing parameters for a satellite-based radio access network.

BACKGROUND

There is an ongoing resurgence of satellite communications. Several plans for satellite networks have been announced in the past few years. The target services vary from backhaul and fixed wireless, to transportation, to outdoor mobile, to Internet of Things (IoT). Satellite networks could complement mobile networks on the ground by providing connectivity to underserved areas and multicast/broadcast services.

To benefit from the strong mobile ecosystem and economy of scale, adapting the terrestrial wireless access technologies including Long Term Evolution (LTE) and New Radio (NR) for satellite networks is drawing significant interest. For example, Third Generation Partnership Project (3GPP) completed an initial study in Release 15 on adapting NR to support non-terrestrial networks (mainly satellite networks) 3GPP Technical Report (TR) 38.811 [1]. This initial study focused on the channel model for the non-terrestrial networks, defining deployment scenarios, and identifying the key potential impacts. 3GPP is conducting a follow-up study item in Release 16 on solutions evaluation for NR to support non-terrestrial networks [2].

A satellite radio access network usually includes the following components:
- A gateway that connects a satellite network to a core network
- A satellite that refers to a space-borne platform
- A terminal that refers to User Equipment (UE)
- A feeder link that refers to the link between a gateway and a satellite
- A service link that refers to the link between a satellite and a terminal The link from the gateway to the terminal is often called a forward link, and the link from the terminal to the gateway is often called a return link or an access link. Depending on the functionality of the satellite in the system, two transponder options can be considered:
- Bent pipe transponder: the satellite forwards the received signal back to the earth with only amplification and a shift from uplink frequency to downlink frequency.
- Regenerative transponder: the satellite includes on-board processing to demodulate and decode the received signal and regenerate the signal before sending it back to the earth.

Depending on the orbit altitude, a satellite may be categorized as a Low Earth Orbit (LEO), a Medium Earth Orbit (MEO), or a Geostationary Orbit (GEO) satellite.
- LEO: typical heights ranging from 500-1,500 kilometers (km), with orbital periods ranging from 10-40 minutes.
- MEO: typical heights ranging from 5,000-12,000 km, with orbital periods ranging from 2-8 hours.
- GEO: height at 35,786 km, with an orbital period of 24 hours.

A satellite typically generates several beams over a given area. The footprint of a beam is usually in an elliptic shape, which has been traditionally considered as a cell. The footprint of a beam is also often referred to as a spotbeam. The footprint of a spotbeam may move over the earth's surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders.

The two main physical phenomena that affect satellite communications system design are the long propagation delay and Doppler effects. The Doppler effects are especially pronounced for LEO satellites.

Propagation delay is a main physical phenomenon in a satellite communication system that makes the design different from that of a terrestrial mobile system. For a bent pipe satellite network, the following delays are relevant:
- One-way delay: from the Base Station (BS) to the UE via the satellite, or the other way around
- Round-trip delay: from the BS to the UE via the satellite and from the UE back to the BS via the satellite
- Differential delay: the delay difference of two selected points in the same spotbeam Note that there may be additional delay between the ground BS antenna and the BS, which may or may not be collocated. This delay depends on deployment. If the delay cannot be ignored, it should be taken into account in the communications system design.

The propagation delay depends on the length of the signal path, which further depends on the elevation angles of the satellite seen by the BS and the UE on the ground. The minimum elevation angle is typically more than 10° for the UE and more than 5° for the BS on the ground. These values will be assumed in the delay analysis below.

The following Tables 1 and 2 are taken from 3GPP TR 38.811 [1]. It can be seen that the round-trip delay is much larger in satellite systems. For example, it is about 545 milliseconds (ms) for a GEO satellite system. In contrast, the round-trip time is normally no more than 1 ms for typical terrestrial cellular networks.

TABLE 1

Propagation delays for GEO satellite at 35,786 km (extracted from Table 5.3.2.1-1 in 3GPP TR 38.811 [1])

| | | GEO at 35786 km | |
|---|---|---|---|
| Elevation angle | Path | D (km) | Time (ms) |
| UE: 10° | satellite - UE | 40586 | 135.286 |
| GW: 5° | satellite - gateway | 41126.6 | 137.088 |
| 90° | satellite - UE | 35786 | 119.286 |
| | Bent Pipe satellite | | |
| One way delay | Gateway-satellite_UE | 81712.6 | 272.375 |
| Round trip Time | Twice | 163425.3 | 544.751 |

TABLE 1-continued

Propagation delays for GEO satellite at 35,786 km (extracted from Table 5.3.2.1-1 in 3GPP TR 38.811 [1])

| | | GEO at 35786 km | |
|---|---|---|---|
| Elevation angle | Path | D (km) | Time (ms) |
| | Regenerative Satellite | | |
| One way delay | Satellite -UE | 40586 | 135.286 |
| Round Trip Time | Satellite-UE-Satellite | 81172 | 270.572 |

TABLE 2

Propagation delays for NGSO satellites (extracted from Table 5.3.4.1-1 in 3GPP TR 38.811 [1])

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite - UE | 1932.24 | 6,440 | 3647.5 | 12,158 | 14018.16 | 46.727 |
| GW: 5° | satellite - gateway | 2329.01 | 7.763 | 4101.6 | 13.672 | 14539.4 | 48.464 |
| 90° | satellite - UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| | Regenerative satellite | | | | | | |
| One way delay | Satellite -UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

Generally, within a spotbeam covering one cell, the delay can be divided into a common delay component and a differential delay component. The common delay is the same for all UEs in the cell and is determined with respect to a reference point in the spotbeam. In contrast, the differential delay is different for different UEs which depends on the propagation delay between the reference point and the point at which a given UE is positioned within the spotbeam.

The differential delay is mainly due to the different path lengths of the access links, since the feeder link is normally the same for terminals in the same spotbeam. Further, the differential delay is mainly determined by the size of the spotbeam. It may range from sub-millisecond (for a spotbeam on the order of tens of kilometers) to tens of milliseconds (for a spotbeam on the order of thousands of kilometers).

Support for non-terrestrial radio access networks (e.g., satellite-based radio access networks), and in particular the large propagation delays associated therewith, introduce new problems that must be addressed.

SUMMARY

Systems and methods for adapting a timer(s) for a satellite-based radio access network are disclosed. Embodiments of a method performed by a wireless device and corresponding embodiments of a wireless device are disclosed. In some embodiments, a method performed by a wireless device for communicating with a satellite-based radio access network comprises obtaining a value to be used to offset, extend, and/or scale one or more timers related to the satellite-based radio access network relative to values of the one or more timers for non-satellite-based radio access networks. The method further comprises utilizing the value to offset a start of one or more timers to provide one or more offset timers, extend one or more timers to provide one or more extended timers, and/or scale one or more timers to provide one or more scaled timers and performing one or more actions based on the one or more offset timers, the one or more extended timers, and/or the one or more scaled timers.

In some embodiments, utilizing the value comprises utilizing the value to offset a start of one or more timers to provide the one or more offset timers, and performing the one or more actions comprises performing one or more actions based on the one or more offset timers. Further, in some embodiments, utilizing the value to offset the start of one or more timers comprises utilizing the value to offset a start of a timer that defines a random access response window for a random access procedure, and performing one or more actions based on the one or more offset timers comprises monitoring for a random access response during the random access window. In some embodiments, utilizing the value to offset the start of one or more timers comprises utilizing the value to offset a start of a timer that defines a contention resolution window for a random access procedure, and performing one or more actions based on the one or more offset timers comprises monitoring for a contention resolution message during the contention resolution window.

In some embodiments, utilizing the value comprises utilizing the value to extend one or more timers to provide the one or more extended timers, and performing the one or more actions comprises performing one or more actions based on the one or more extended timers. Further, in some embodiments, utilizing the value to extend one or more timers to provide the one or more extended timers comprises utilizing the value to extend a Hybrid Automatic Repeat Request (HARQ) Round Trip Time (RU) timer to provide an extended HARQ RU timer, and performing one or more actions based on the one or more extended timers comprises performing a HARQ procedure based on the extended HARQ RU timer. In some embodiments, utilizing the value to extend one or more timers to provide the one or more extended timers comprises utilizing the value to extend a scheduling request prohibit time timer to provide an extended scheduling request prohibit timer, and performing one or more actions based on the one or more extended timers comprises: sending a scheduling request, starting the extended scheduling request prohibit timer upon sending the scheduling request, and prohibiting a new scheduling request until the extended scheduling request prohibit timer has expired.

In some embodiments, utilizing the value comprises utilizing the value to scale one or more timers to provide the one or more scaled timers, and performing the one or more actions comprises performing one or more actions based on the one or more scaled timers. Further, in some embodiments, utilizing the value to scale one or more timers to provide the one or more scaled timers comprises: determining a minimum timer value for one or more timers as a function of the value, determining a step size between two timer values for one or more timers as a function of the value, and/or determining a number of supported timer values for one or more timers as a function of the value. In some embodiments, the one or more scaled timers are one or more scaled Radio Link Control (RLC) timers.

In some embodiments, obtaining the value comprises receiving the value or an adjustment to the value from a base station in the satellite-based radio access network. Further, in some embodiments, receiving the value or the adjustment to the value from the base station via Radio Resource Control (RRC) signaling or Medium Access Control (MAC) signaling.

In some embodiments, obtaining the value comprises computing the value at the wireless device.

In some embodiments, obtaining the value comprises receiving the value via system information broadcast from a base station and/or estimating the value from open loop timing estimates using Global Positioning System (GPS) techniques.

In some embodiments, a wireless device for communicating with a satellite-based radio access network comprises one or more transmitters, one or more receivers, and processing circuitry associated with the one or more transmitters and the one or more receivers. The processing circuitry is configured to cause the wireless device to obtain a value to be used to offset, extend, and/or scale one or more timers related to the satellite-based radio access network relative to values of the one or more timers for non-satellite-based radio access networks. The processing circuitry is further configured to cause the wireless device to utilize the value to offset a start of one or more timers to provide one or more offset timers, extend one or more timers to provide one or more extended timers, and/or scale one or more timers to provide one or more scaled timers and perform one or more actions based on the one or more offset timers, the one or more extended timers, and/or the one or more scaled timers.

Embodiments of a method performed by a base station and corresponding embodiments of a base station are also disclosed. In some embodiments, a method performed by a base station for a satellite-based radio access network comprises sending, to a wireless device, a value or an adjustment to the value to be used to offset, extend, and/or scale one or more timers related to the satellite-based radio access network relative to values of the one or more timers for non-satellite-based radio access networks.

In some embodiments, the one or more timers comprise a timer that defines a size of a random access response window. In some embodiments, the one or more timers comprise a timer that defines a contention resolution window for a random access procedure. In some embodiments, the one or more timers comprise a HARQ RU timer. In some embodiments, the one or more timers comprise a scheduling request prohibit timer.

In some embodiments, sending the value or adjustment to the value to the wireless device comprises broadcasting system information that comprises the value. In some embodiments, sending the value or adjustment to the value to the wireless device comprises sending the value or the adjustment to the value to the wireless device during a random access procedure. In some embodiments, sending the value or adjustment to the value to the wireless device comprises sending the value or the adjustment to the value to the wireless device when the wireless device is in a connected state. In some embodiments, sending the value or adjustment to the value to the wireless device comprises sending the value or the adjustment to the value to the wireless device via RRC signaling or MAC signaling.

In some embodiments, a base station for a satellite-based radio access network comprises processing circuitry configured to cause the base station to send, to a wireless device, a value or an adjustment to the value to be used to offset, extend, and/or scale one or more timers related to the satellite-based radio access network relative to values of the one or more timers for non-satellite-based radio access networks.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 16 through 19 are flowcharts illustrating methods implemented in a communication system, in accordance with various embodiments.

DETAILED DESCRIPTION

Figure 1:
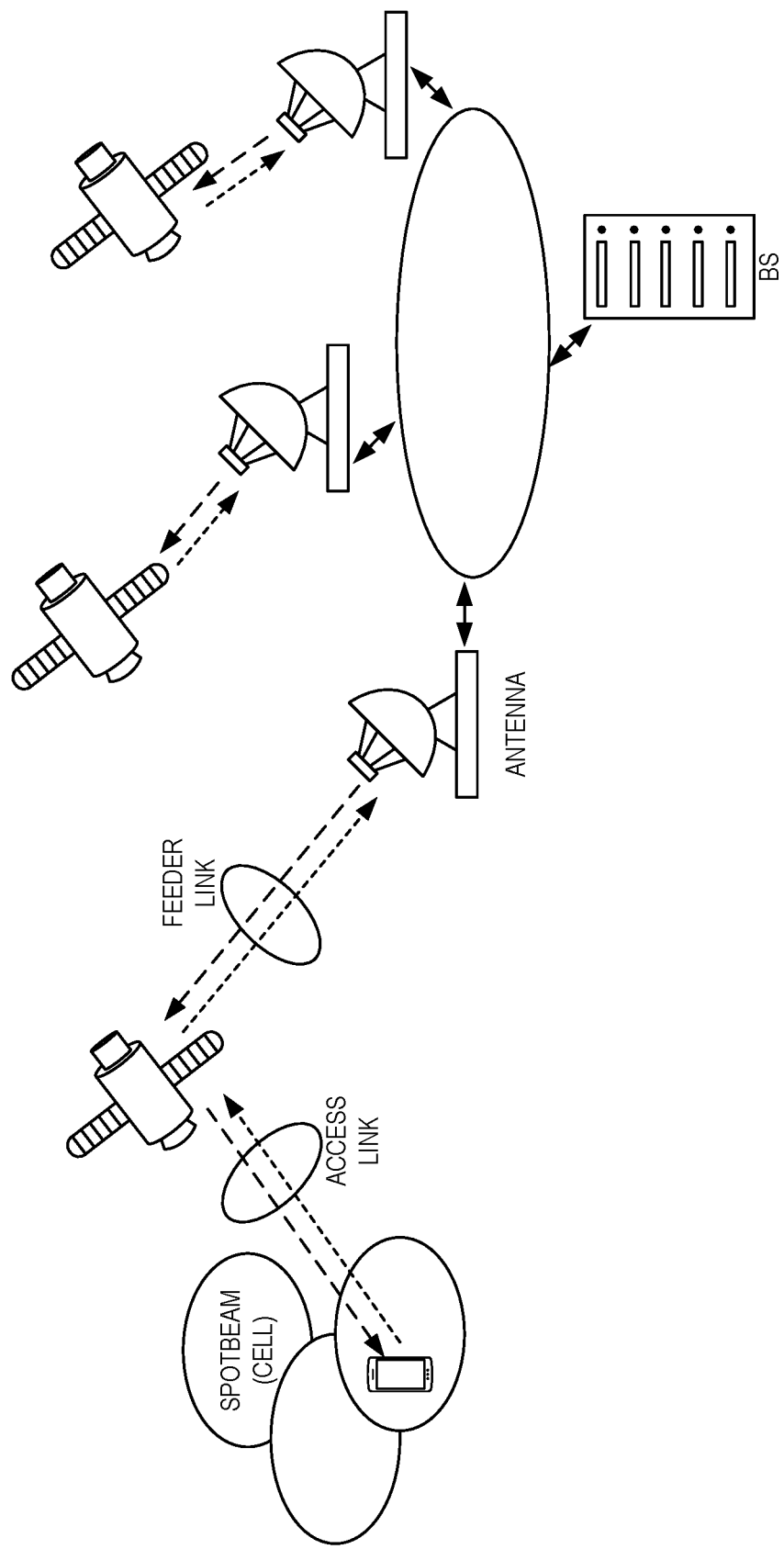
FIG. 1 shows an example architecture of a satellite network with bent pipe transponders.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Note that, in the following description, the problems and solutions are described using LTE terminology; however, it should be understood that the same or similar solutions may apply for NR.

There currently exist certain challenge(s). The current design of LTE and NR is not suitable for satellite communications as it relies on a fixed timing between the base station (i.e., the eNB in LTE) and the UE, where the propagation delay is within one subframe (i.e., 1 millisecond (ms)). In satellite communication systems, the round-trip delay can range from tens of milliseconds to an excess of 500 ms. Applying the current 3GPP standards to satellite communications would not only result in low capacity, but several timers would time-out prematurely or even cause a broken functionality.

Random Access monitoring windows in LTE and NR: During the Random Access (RA) procedure, in the RA response window period, the UE monitors the Physical Downlink Control Channel (PDCCH) for a Random Access Response (RAR) (which is also referred to as MSG2) after having sent a RA preamble (MSG1). The RAR window is configured by ra-ResponseWindowSize (ra-ResponseWindow in NR), and it starts at the subframe that contains the end of the preamble transmission plus three subframes and has length ra-ResponseWindowSize. In the current standards, the size of ra-ResponseWindowSize is up to 10 ms for normal UEs and up to 400 ms for UEs in extended mode.

In another example, when MSG3 is sent in the RA procedure, mac-ContentionResolutionTimer (ra-ContentionResolutionTimer in NR) starts, and the UE monitors the PDCCH until mac-ContentionResolutionTimer expires or is stopped by the reception of the contention resolution message (MSG4). The size of the mac-ContentionResolutionTimer is configurable, with the maximum being 64 ms for a normal UE and extended to 960 ms for a UE in extended mode.

Figure 2:
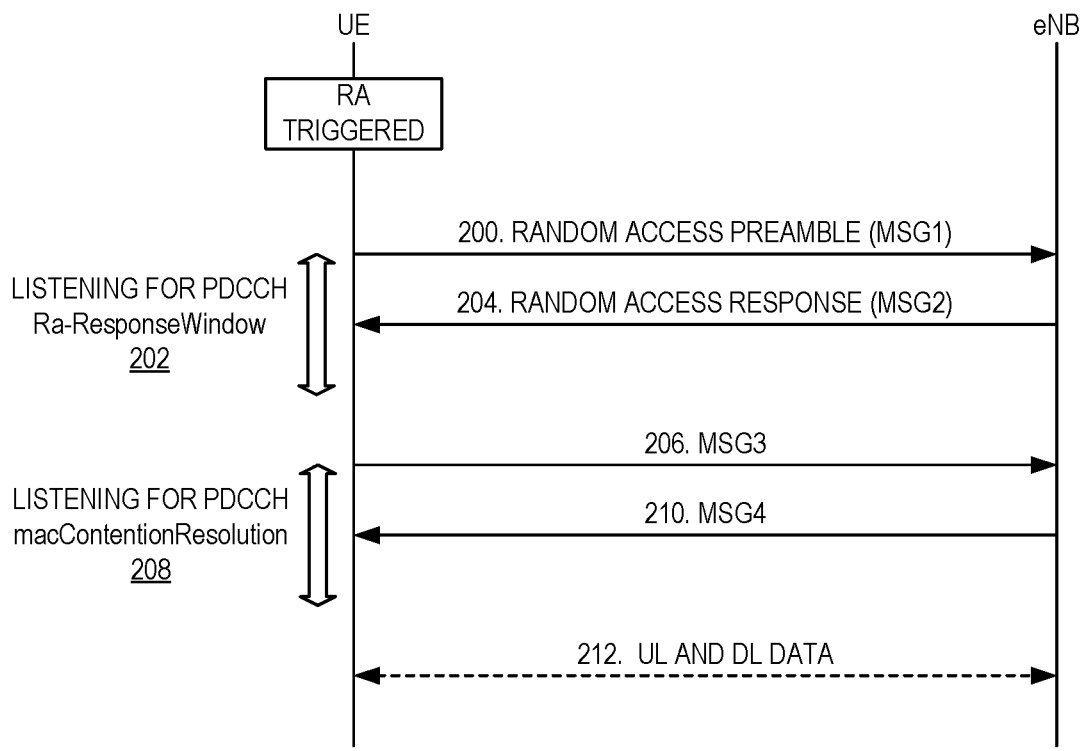
FIG. 2 illustrates the behavior of legacy random access monitoring windows.

FIG. 2 illustrates the behavior of legacy RA monitoring windows. As illustrated, when RA is triggered at the UE, the UE transmits a RA preamble, which is also referred to as MSG1 (step 200). During the RA response window, the UE monitors the PDCCH for a RAR from the eNB (step 202). In the illustrated example, the eNB transmits a RAR, which is also referred to as MSG2, and the UE detects the RAR during the RA response window (step 204). The UE then transmits MSG3 (step 206) and monitors PDCCH for MSG4 (step 208). In the illustrated example, the eNB transmits a MSG4, and the UE detects the MSG4 (step 210). Thereafter uplink and downlink data is transmitted between the UE and the eNB (step 212).

Since the Round Trip Time (RTT) can be more than 500 ms in satellite communications, the windows used for the current RA procedure are not enough to cover the RTT.

HARQ-RTT Timer: A Hybrid Automatic Repeat Request (HARQ) RTT timer is used in Discontinuous Reception (DRX) by utilizing the observation that it takes time for sending one transmission until the next retransmission. For example, the HARQ RTT timer is configured for each downlink HARQ process. When decoding of a downlink transport block for one HARQ process fails, the UE starts the HARQ RTT timer for the HARQ process, assuming that the earliest that the next HARQ retransmission of the process will occur is after the expiry of the HARQ RTT timer, i.e., the UE does not monitor PDCCH while the HARQ RTT timer is running unless in active mode and induced by other timers.

The HARQ RTT timer is "hardcoded" to a value that is based on the propagation delay and processing delay expected for terrestrial networks, which is typically around 8 ms. The HARQ RTT timers are thus not dimensioned for satellite networks.

Scheduling Request Prohibit Timer: Scheduling Requests (SRs) are used for the UE to ask for uplink resources. SRs are scheduled periodically in a certain interval and the interval periods are configurable using field $SR_{PERIODICITY}$, which has a maximum value of 80 ms in current standards. In order to prevent the UE from sending unnecessary SRs while waiting for the uplink grant, the eNB/gNB has the option to prohibit the UE from sending an SR for a configurable amount of SR opportunities using field sr-ProhibitTimer, which has a maximum value of 7 in current standards.

The amount of time that the UE is unable to send SRs is thus sr-ProhibitTimer*$SR_{PERIODICITY}$, which would be 560 ms. This would not be able to provide enough flexibility for the satellite networks.

Figure 3:
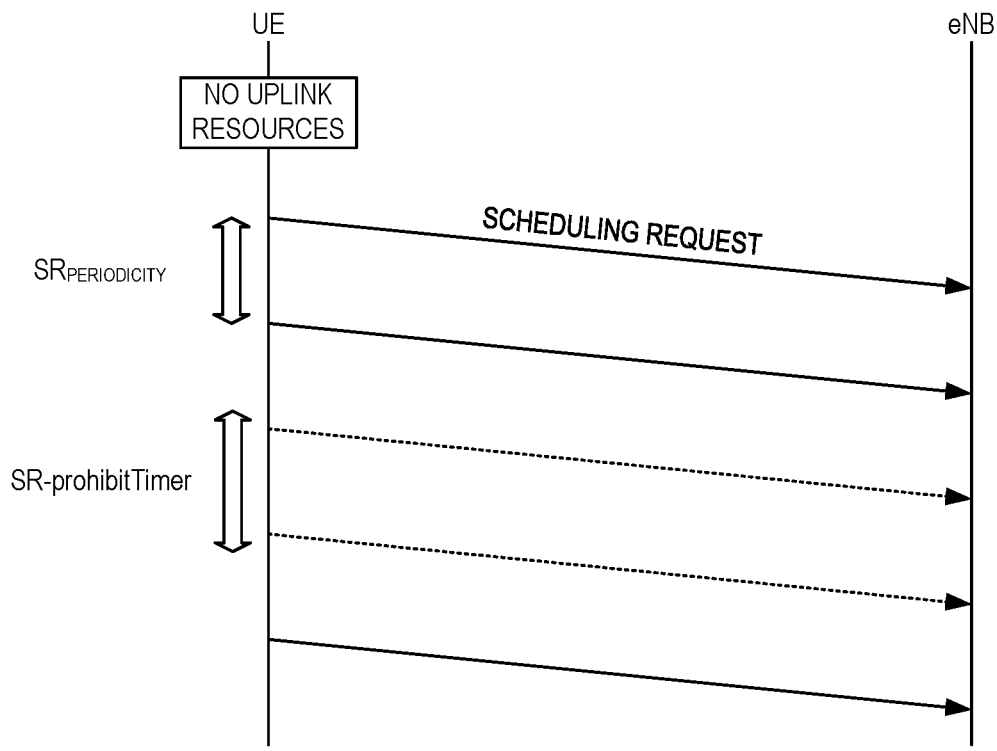
FIG. 3 illustrates a scheduling request with its periodicity and prohibit timer.

FIG. 3 illustrates a SR with its periodicity and prohibit timer. In the illustrated example, the sr-ProhibitTimer prohibits the UE from sending SRs for two SR opportunities, as represented by the dashed arrows. As noted above, in current standards, the maximum value of sr-ProhibitTimer is 7, which is not sufficient for satellite networks.

RLC Timers: The t-PollRetransmit is used by the transmitting side of an Acknowledge Mode (AM) Radio Link Control (RLC) entity to retransmit a poll. It is started when a polling bit is set and stopped if the status report is received. If it expires, then the polling bit is re-transmitted.

The t-StatusProhibit timer is used by the receiving side of an AM RLC entity to prohibit transmission of a STATUS Protocol Data Unit (PDU). The STATUS PDU is triggered when a polling request is received or a missing RLC data PDU is detected. During the prohibit timer period, the STATUS PDU is not transmitted. After it expires, it is transmitted only once even if multiple STATUS PDUs are triggered to be sent. This is to prevent a frequent transmission of status report, but a long interval may cause windows stalling at the transmitter since the transmitter needs a positive Acknowledgment (ACK) from the receiver to advance the window and send the next packet.

The t-Reordering (or T-reassembly in NR) timer is used by the receiving side of an AM RLC entity to reorder sequences that arrive out of date due to HARQ retransmissions.

The original values of the first two timers start from 0 ms for t-StatusProhibit and 5 ms for t-PollRetransmit with a step size of 5 ms to 500 ms, and for UEs in extended mode these are extended with the values 800, 1000, 1200, 1600, and 2000 ms for t-StatusProhibit and with 800, 1000, 2000 and 4000 ms for t-PollRetransmit. For t-Reordering, the original values range from 0 to 200 ms with a 5 ms and 10 ms step size. These current values would not allow for flexible enough configuration for the satellite case.

Certain aspects of the present disclosure and their embodiments may provide solutions to the aforementioned or other challenges. Systems and methods for configuring and extending timers relating to higher-layer functionality by using a parameter (denoted herein as a RTT parameter or variable) are disclosed.

In some embodiments, a RTT variable is introduced that is used as an offset to increase or delay other timers in order for the network to deal with long propagation delays that exist in for example satellite communication systems.

Certain embodiments may provide one or more of the following technical advantage(s). The proposed solution introduces a single field that is used to adapt several critical timers instead of adapting several timers using different fields. The solution allows flexible configuration for the satellite case.

Figure 4:
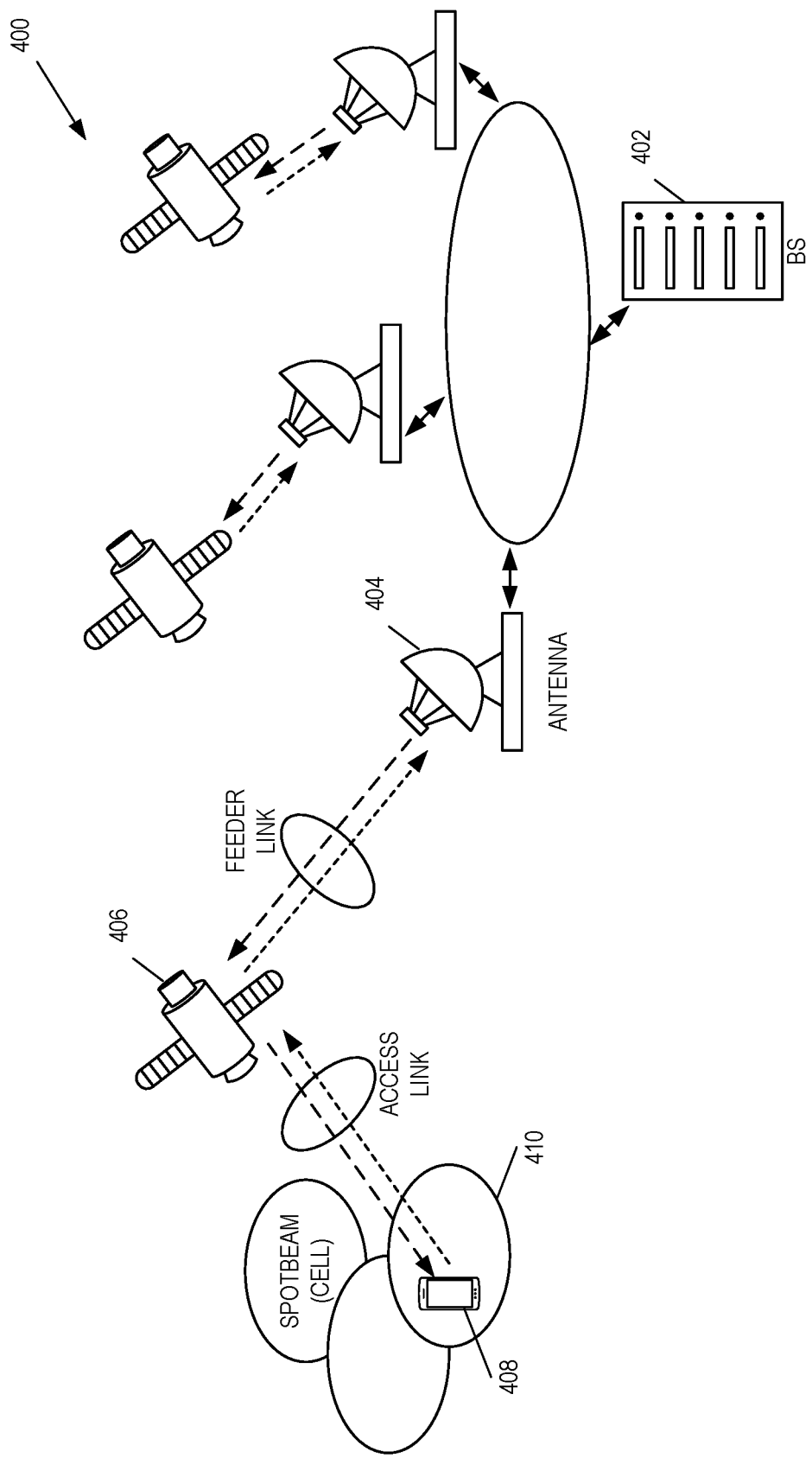
FIG. 4 illustrates one example of a satellite-based radio access network in which embodiments of the present disclosure may be implemented.

In this regard, FIG. 4 illustrates one example of a satellite-based radio access network 400 in which embodiments of the present disclosure may be implemented. In some embodiments, the satellite-based radio access network 400 is a radio access network for a cellular communications network such as, e.g., an LTE or NR network.

As illustrated, the satellite-based radio access network 400 includes, in this example, a base station 402 that connects the satellite-based radio access network 400 to a core network (not shown). In this example, the base station 402 is connected to a ground-based base station antenna 404 that is, in this example, remote from (i.e., not collocated with) the base station 402. The satellite-based radio access network 400 also includes a satellite 406, which is a space-borne platform, that provides a satellite-based access link to a UE 408 located in a respective spotbeam, or cell, 410.

The term "feeder link" refers to the link between the base station 402 (i.e., the ground-based base station antenna 404 in this example in which the base station 402 and the ground-based base station antenna 404 are not collocated) and the satellite 406. The term "service link" (also referred to as "access link") refers to the link between the satellite 406 and the UE 408. The link from the base station 402 to the UE 408 is often called the "forward link," and the link from the UE 408 to the base station 402 is often called the "return link" or "access link." Depending on the functionality of the satellite 406 in the satellite-based radio access network 400, two transponder options can be considered:

Bent pipe transponder: the satellite forwards the received signal back to the earth with only amplification and a shift from uplink frequency to downlink frequency.

Regenerative transponder: the satellite includes on-board processing to demodulate and decode the received signal and regenerate the signal before sending it back to the earth.

Several embodiments of a method for configuring timings by a new parameter RTT will now be described.

First Embodiment

In one embodiment, RTT is added in the procedure related with the timing rather than extending the timer or window value range. In what follows in this subsection, this embodiment is illustrated by a number of non-limiting examples.

Round-Trip Time for Random Access Procedure: In this example, instead of increasing the timers ra-ResponseWindowSize (ra-ResponseWindow in NR) and macContentionResolutionTimer (ra-ContentionResolutionTimer in NR), the beginning of these windows are offset by the RTT as illustrated in FIG. 5.

Figure 5:
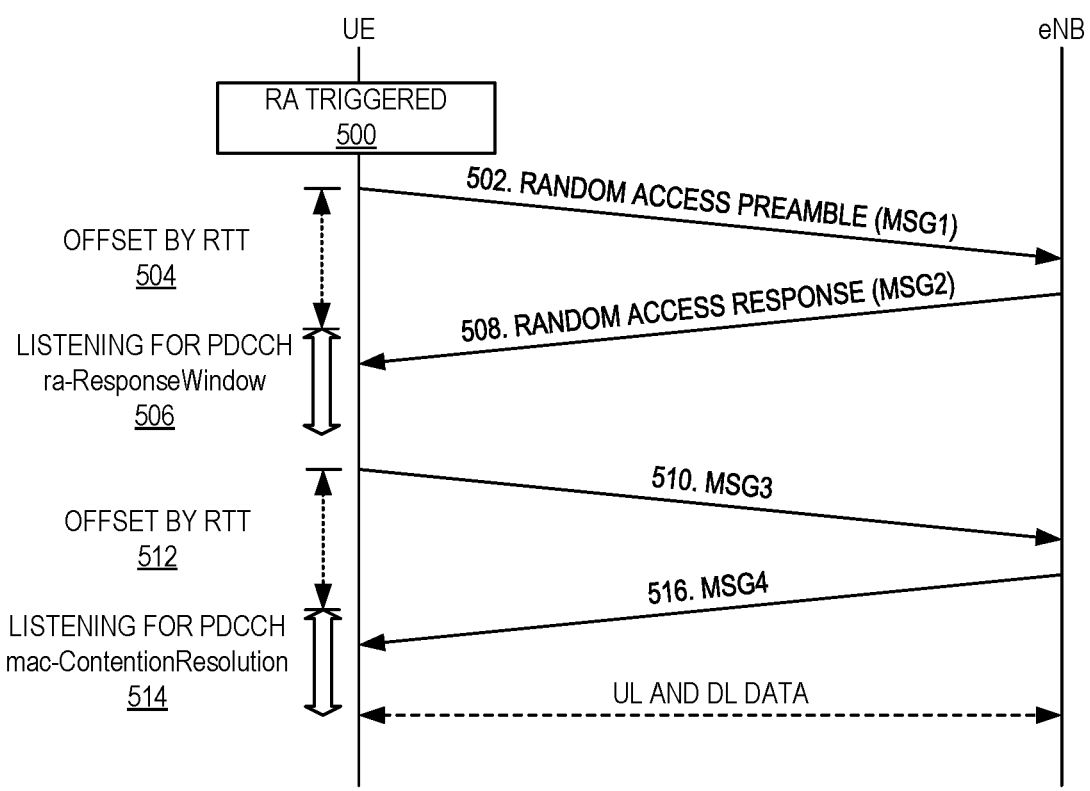
FIG. 5 illustrates a random access procedure in which timers are adapted for a satellite-based radio access network in accordance with some embodiments of the present disclosure.

In particular, FIG. 5 illustrates a RA procedure in which:
the beginning of the RAR Window (which is configured by ra-ResponseWindowSize in LTE and ra-ResponseWindow in NR) is offset by an amount of time defined by the RTT value, and
the beginning of the contention resolution message window (which is configured by macContentionResolutionTimer in LTE and ra-ContentionResolutionTimer in NR) is offset by an amount of time defined by the RTT value.

As illustrated in FIG. 5, the RA procedure is triggered in the UE (step 500). The UE then transmits a RA preamble (MSG1) (step 502). Rather than starting the RAR window (i.e., the RAR window timer) at the conventional time (e.g., at the subframe that contains the end of the RA preamble transmission plus three subframes), the UE delays the start of the RAR window by an amount defined by the RTT value (step 504). Then, during the (delayed) RAR window, the UE monitors for a RAR (step 506). In this example, the eNB transmits, and the UE receives, a RAR (MSG2) during the (delayed) RAR window (step 508).

The UE then sends a message (MSG3) to the eNB (step 510). Rather than starting the contention resolution window (i.e., the contention resolution timer) at the conventional time (i.e., at the time of sending MSG3), the UE delays the start of the contention resolution window by an amount defined by the RTT value (step 512). Then, during the (delayed) contention resolution window, the UE monitors for a contention resolution message (step 514). In this example, the eNB transmits and the UE receives a content resolution message (MSG4) during the contention resolution window (step 516). Thereafter uplink and downlink data is optionally transmitted between the UE and the eNB.

Second Embodiment

In this embodiment, RTT is added as an offset in the value range of the timer or window. The following illustrates this by non-limiting examples.

Round-trip time addition for HARQ RTT Timer: In this embodiment, the HARQ-RTT timer is extended by a value of RTT. For example, the HARQ RTT timer is configured for each downlink HARQ process. When decoding of a downlink transport block for one HARQ process fails, the UE starts the HARQ RTT timer for the HARQ process, assuming that the earliest that the next HARQ retransmission of the process will occur is after the expiry of the HARQ RTT timer, i.e., UE does not monitor PDCCH while the HARQ RTT timer is running unless in active mode and induced by other timers. In this embodiment, the HARQ RTT timer is extended by a value of RTT (e.g., extended from a hard-coded value of, e.g., 8 ms to that value plus RTT).

Figure 6:
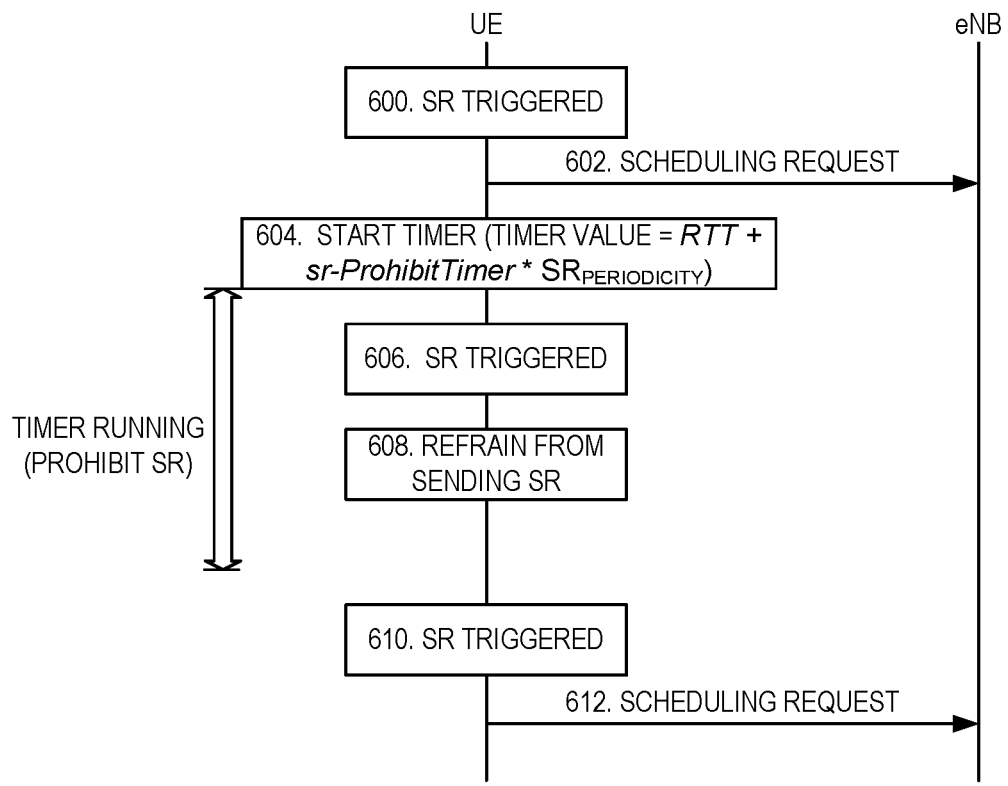
FIG. 6 illustrates a scheduling request procedure in which a prohibit timer is adapted for a satellite-based radio access network in accordance with some embodiments of the present disclosure.

Round-trip time addition for scheduling request prohibit time: In this embodiment, the SR prohibit time is increased by an offset RTT. The total time that an SR is prohibited is thus RTT+sr-ProhibitTimer*$SR_{PERIODICITY}$. For instance, the UE sends a first SR and starts a timer for prohibiting another SR. In this embodiment, this timer is set to a value of RTT+sr-ProhibitTimer*$SR_{PERIODICITY}$. Thereafter, when the UE desires to send a second SR, the UE checks the timer. If the timer is still running, the UE refrains from sending the second SR (i.e., the second SR is prohibited). Conversely, if the timer has expired, the UE sends the second SR. An example of this is illustrated in FIG. 6. In the example of FIG. 6, an SR is triggered at the UE (step 600). In response, the UE sends an SR (step 602) and starts a timer having a value of RTT+sr-ProhibitTimer*$SR_{PERIODICITY}$ (step 604). While this timer is running, SRs are prohibited. As such, when an SR is triggered at the UE while the timer is running (step 606), the UE refrains from sending the SR (in other words, the UE decides that the SR is prohibited and therefore does not send an SR) (step 608). After the timer has expired, when an SR is triggered (step 610), the UE sends an SR (in other words, the UE decides that the SR is allowed since the timer is no longer running and therefore sends the SR) (step 612).

Similar ideas can be used for other Medium Access Control (MAC) timers. For example, the method can be used in the MAC timers for a buffer status report.

Third Embodiment

In this embodiment, the value of, e.g., the RLC timers t-StatusProhibit, t-PollRetransmit, and t-Reordering is scaled by a factor of RTT/5. For example, the value is ranged from 500 ms with a step size of 500 ms to 50 seconds instead of 5 ms in the current standards.

More generally, a timer can be configured with the following three parameters:
  MinTimerValue: this value indicates the minimum value supported by this timer
  StepSize: this value indicates the step size between two timer values
  NumTimerValues: this value indicates how many timer values are supported
With these, the value range supported for the timer is MinTimerValue, MinTimerValue+StepSize, . . . , MinTimerValue+(NumTimerValues−1)*StepSize. The configuration of MinTimerValue, StepSize, and/or NumTimerValues may be linked to the RTT.

Thus, the UE sets a value of a timer(s) (e.g., an RLC timer(s)) as a function of RTT and performs an action(s) based on the timer(s). In the third embodiment, the timer(s) is a function of RTT in that the minimum value supported by the timer(s), the step size between two values for the timer(s), and/or the number of timer values supported for the timer(s) are function(s) of the RTT value.

Fourth Embodiment

This embodiment is about how to acquire, update, and/or configure RTT. A number of non-limiting examples of how the RTT can be acquired, updated, and/or configured are described below.
  Before random access:
    RTT is provided by System Information (SI)
      SI may have an indicator (e.g., a bit) that indicates whether RTT should be used or not. If the indicator is set to one value (e.g., if the indicator bit is set to "1"), the UE is assumed to take the given RTT and apply it to timers, e.g., as described in the first, second, and/or third embodiments described above and/or other RTT affected timers. If the indictor is set to another value (e.g., if the indicator bit is set to "0"), the UE does not apply RTT to timers. In some embodiments, there may be different indicators (e.g., different bits) for different timers or different groups of timers. In some embodiments, there may be a separate indicator (e.g., bit) per timer or usage of the RTT. Alternatively, the presence of the field of the indicator (e.g., bit) or the RTT can indicate if the UE should apply the given RTT. If the field is present, the UE applies the RTT, otherwise UE does not apply it. For example, the UE may have also implemented Global Positioning System (GPS)-based open loop timing estimation but an indicator (e.g., bit) in SI may configure the UE to use the RTT given in SI instead.
    The RTT can be used by the UE as an estimate before the start of a random access procedure.
    The RTT may be an average RTT corresponding to a center of the cell.
    In case of NR, RTT may be given for each Synchronization Signal Block (SSB) beam to give an average RTT of the SSB beam.
    The UE applies RTT based on operator identity.
    The UE may estimate RTT through open-loop methods and set the RTT to this value.
  During random access:
    RTT can be estimated using the RA procedure.
    The RTT can be provided or adjusted by the eNB using timing advance in MSG2 or MSG4.
  During RRC_Connected:
    The eNB can adjust RTT through Radio Resource Control (RRC) or MAC signaling.
    The eNB may provide a new RTT for the target cell in a Handover (HO) command.
    The eNB may adjust RTT via a MAC Control Element (CE) by updating an offset or by giving a new value or both.
    RRC may also indicate whether to apply the RTT through a bit, where if the bit is set to "1," then the RTT is applied, else it is not applied.

Figure 7:
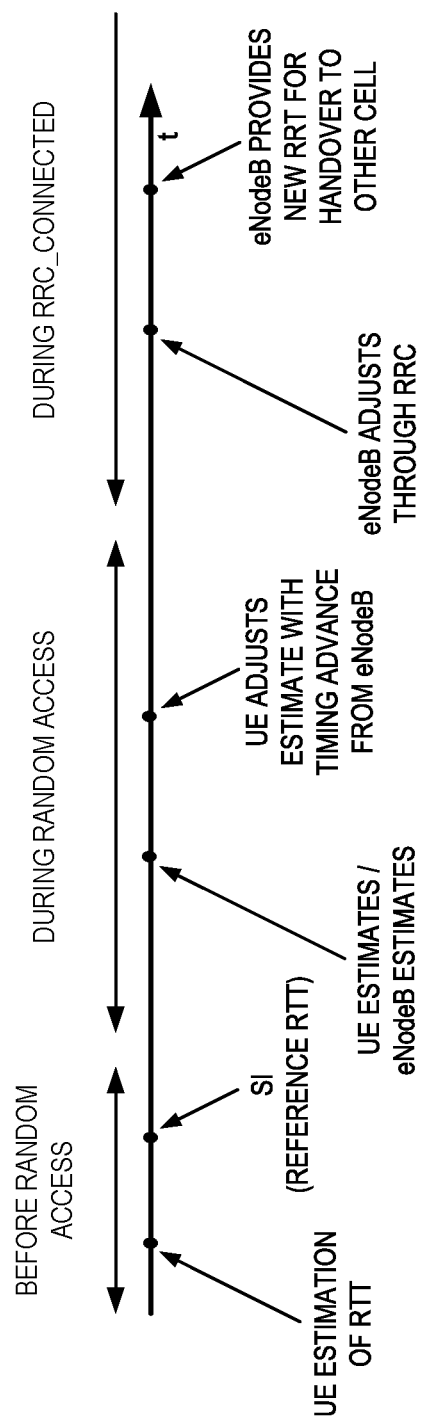
FIG. 7 illustrates different techniques that can be used to configure a Round Trip Time (RU) parameter for adapting a timer(s) for a satellite-based radio access network, depending on the state of the User Equipment (UE), in accordance with some embodiments of the present disclosure.

FIG. 7 illustrates different methods that can be used to configure RTT depending on the state of the UE.

Fifth Embodiment

Since propagation delay depends on the length of the signal path, different UEs in a spot beam will have different RTTs associated with them. Hence, before a UE has performed RA, the eNB may not have information regarding the RTT associated with that particular UE.

In this embodiment, the eNB broadcasts a reference RTT as part of SI wherein the RTT broadcasted corresponds to the worst-case RTT for all UEs in the cell. The broadcasted RTT value is used by all the UEs in the spot beam, e.g., as the RTT offset in the example of FIG. 5 during RA.

During RA, the eNB can acquire the RTT associated with the UE performing RA using the methods described in the Fourth Embodiment. For instance, the UE can estimate its RTT using open loop techniques such as GPS and include this estimate as part of MSG3 to the eNB. Once the eNB acquires the RTT specific to the UE, the eNB can RRC configure the UE with this UE-specific RTT.

In some embodiments, this UE-specific RTT overrides the worst-case (default) RTT broadcasted by the eNB and is used by the UE, e.g., as the RTT offset in the example of FIG. 5 for subsequent RA attempts.

In some other embodiments, the UE-specific RTT is used to extend the HARQ RTT timer as discussed in the Second Embodiment.

In some further embodiments, the UE-specific RTT is used to extend the SR prohibit time (for instance, by adding the UE-specific RTT to sr-ProhibitTimer*$SR_{PERIODICITY}$). Furthermore, the UE-specific RTT can be used extend the MAC timers for a buffer status report.

Similarly, in some embodiments, the UE-specific RTT can be used to scale RLC timers by replacing RTT in the Third Embodiment with the UE-specific RTT.

Additional Aspects

Figure 8:
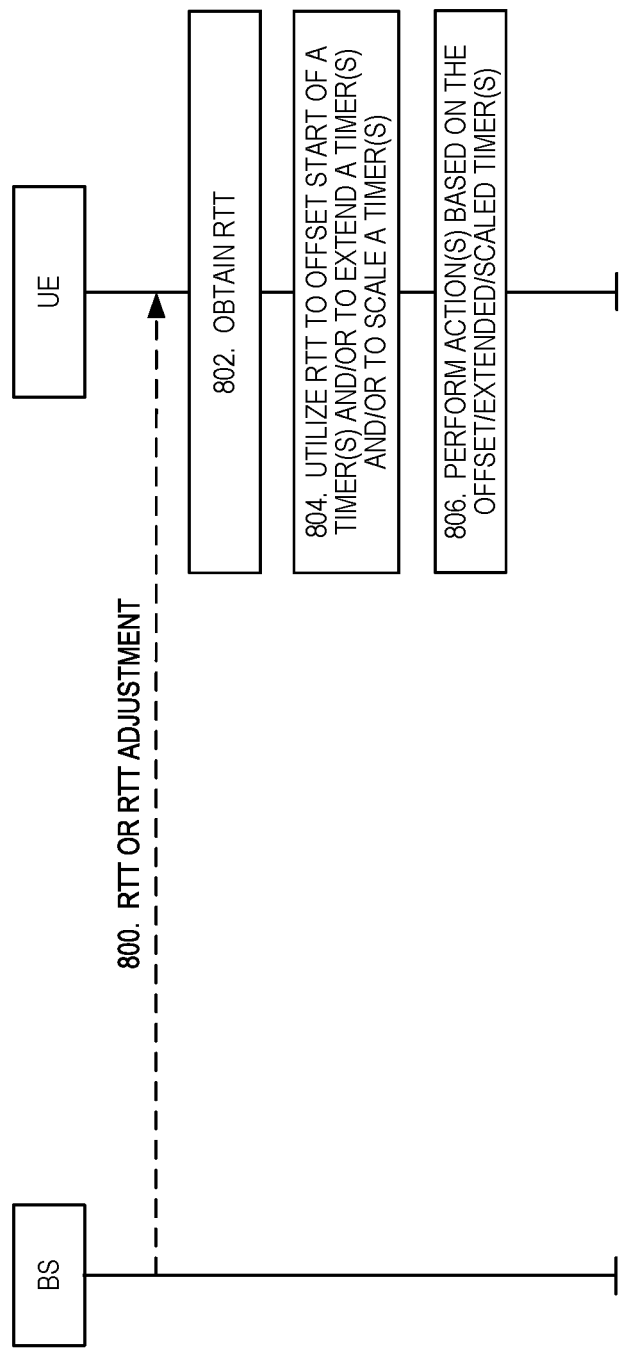
FIG. 8 illustrates the operation of a Base Station (BS) and a UE in accordance with at least some aspects of the embodiments described herein.

FIG. 8 illustrates the operation of a BS (e.g., the base station 402) and a UE (e.g., the UE 408) in accordance with at least some aspects of the First through Fifth Embodiments described above. Optional steps are represented by dashed lines. As shown, the BS optionally sends a RTT or an adjustment to the RTT to the UE (step 800). For example, the RTT (e.g., a reference RTT) can be provided in SI. As another example, the BS may estimate the RTT during RA and send the RTT or an adjustment to the RTT (e.g., relative to the reference RTT) to the UE. As another example, while the UE is in RRC Connected state, the BS may signal the RTT or an adjustment to the RTT to the UE via RRC signaling.

The UE obtains the RTT (step 802). For example, the UE may obtain the RTT from SI or from signaling from the BS. As another example, the UE may determine (e.g., estimate) the RTT. The UE utilizes the RTT to offset a start time of a timer(s) (e.g., as described above with respect to the First Embodiment) and/or extend a timer(s) (e.g., as described above with respect to the Second Embodiment), and/or scale a timer(s) (e.g., as described above with respect to the Third Embodiment) (step 804). The UE performs action(s) based on the offset/extended/scaled timer(s) (step 806).

Figure 9:
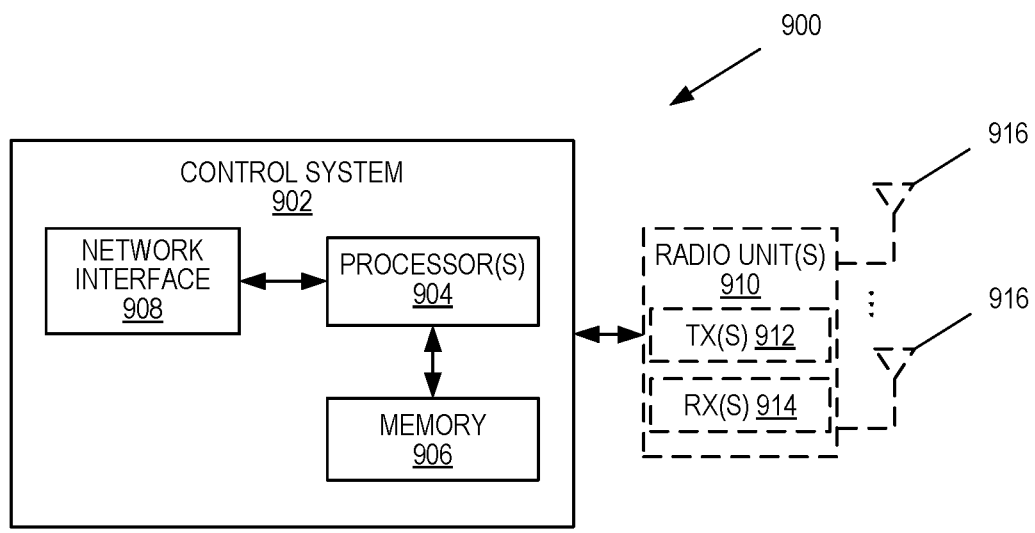
FIGS. 9 to 11 illustrate example embodiments of a radio access node.

FIG. 9 is a schematic block diagram of a radio access node 900 according to some embodiments of the present disclosure. The radio access node 900 may be, for example, the base station 402 or the combination of the base station 402 and the ground-based base station antenna 404 described above. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, in some embodiments, the radio access node 900 includes one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). For example, the control system 902 may be implemented in the base station 402, and the radio unit(s) 910 and antennas 916 may be implemented in the base station antenna 404. However, in some other embodiments, the radio unit(s) 910 and potentially the antenna(s) 916 are integrated together with the control system 902. The one or more processors 904 operate to provide one or more functions of a radio access node 900 (e.g., one or more functions of the base station, eNB, or gNB) as described herein. In some embodiments, the function(s) are implemented in software that is stored, e.g., in the memory 906 and executed by the one or more processors 904.

Figure 10:
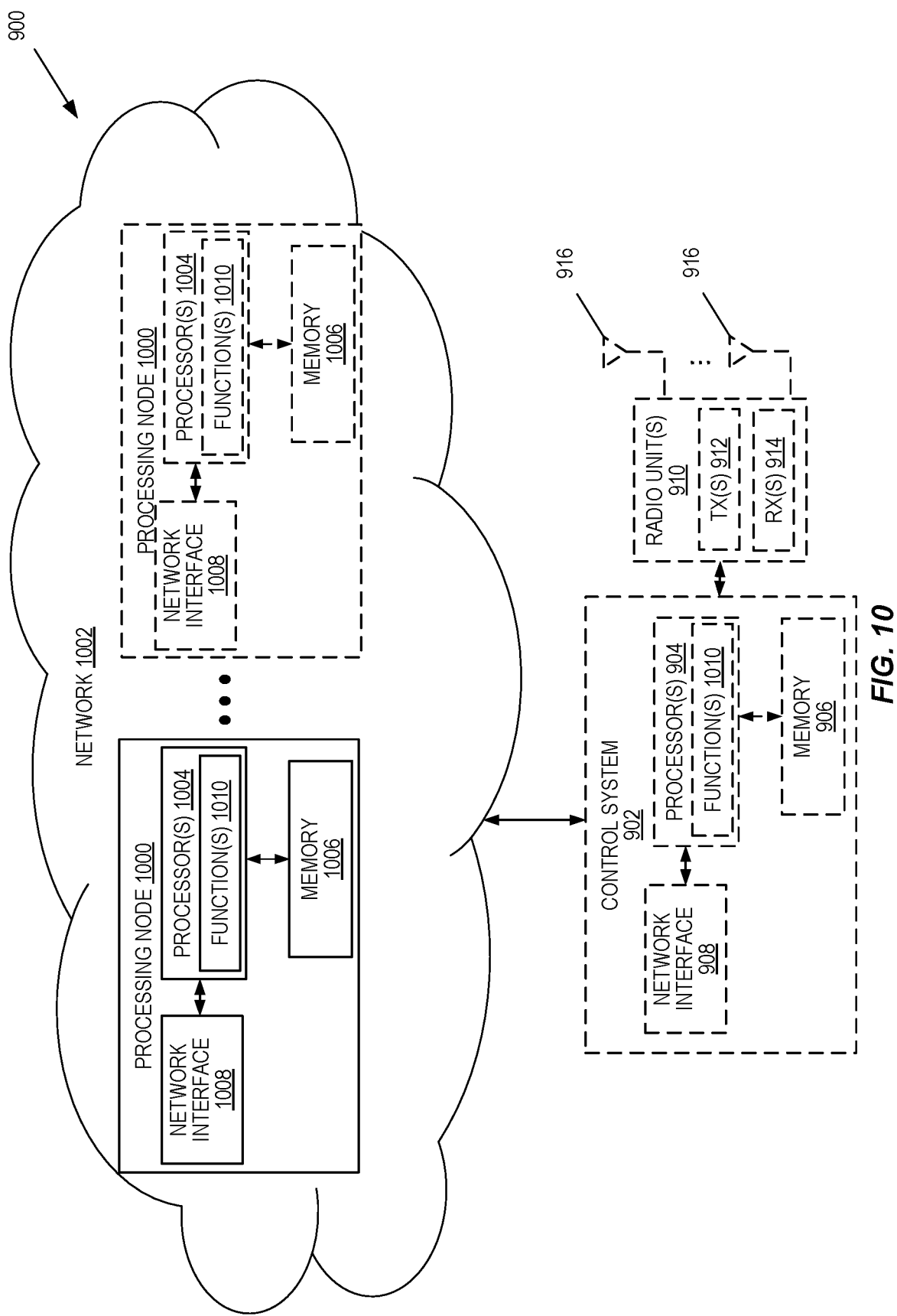

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008. Optionally, the radio access node 900 includes the control system 902 and/or the radio unit(s) 910, depending on the particular implementation.

In this example, functions 1010 of the radio access node 900 described herein (e.g., functions of the base station, eNB, or gNB described herein) are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. Notably, in some embodiments, the control system 902 may not be included, in which case the radio unit(s) 910 can communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
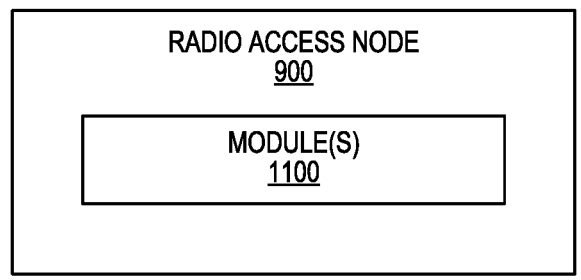

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
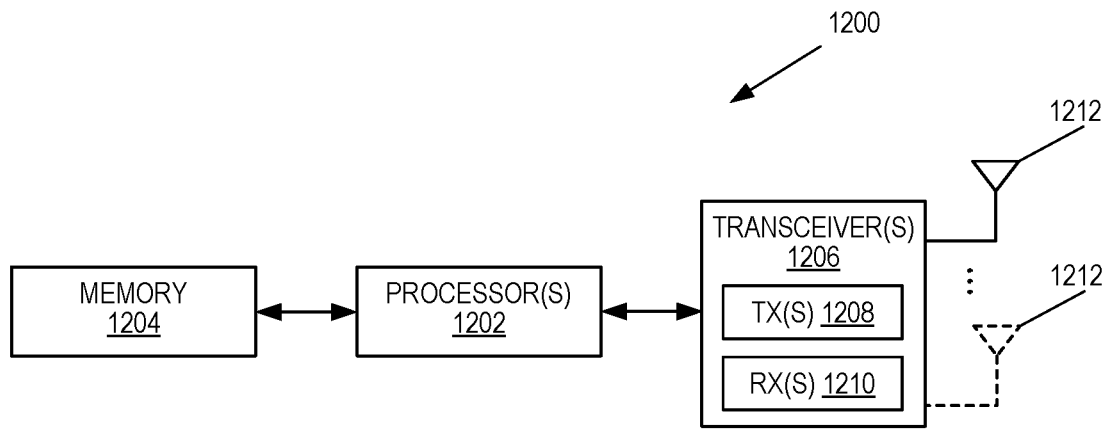
FIGS. 12 and 13 illustrate example embodiments of a UE.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the UE 1200 (i.e., the functionality of the UE) described above may be fully or partially implemented in software that is, e.g., stored in the memory 1204 and executed by the processor(s) 1202. Note that the UE 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the UE 1200 and/or allowing output of information from the UE 1200), a power supply (e.g., a battery and associated power circuitry), etc.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
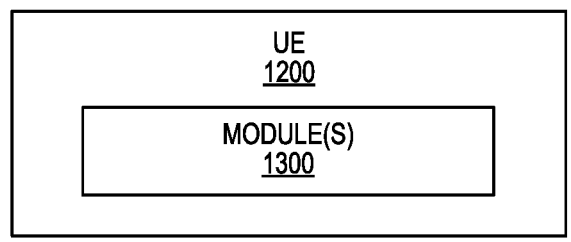

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
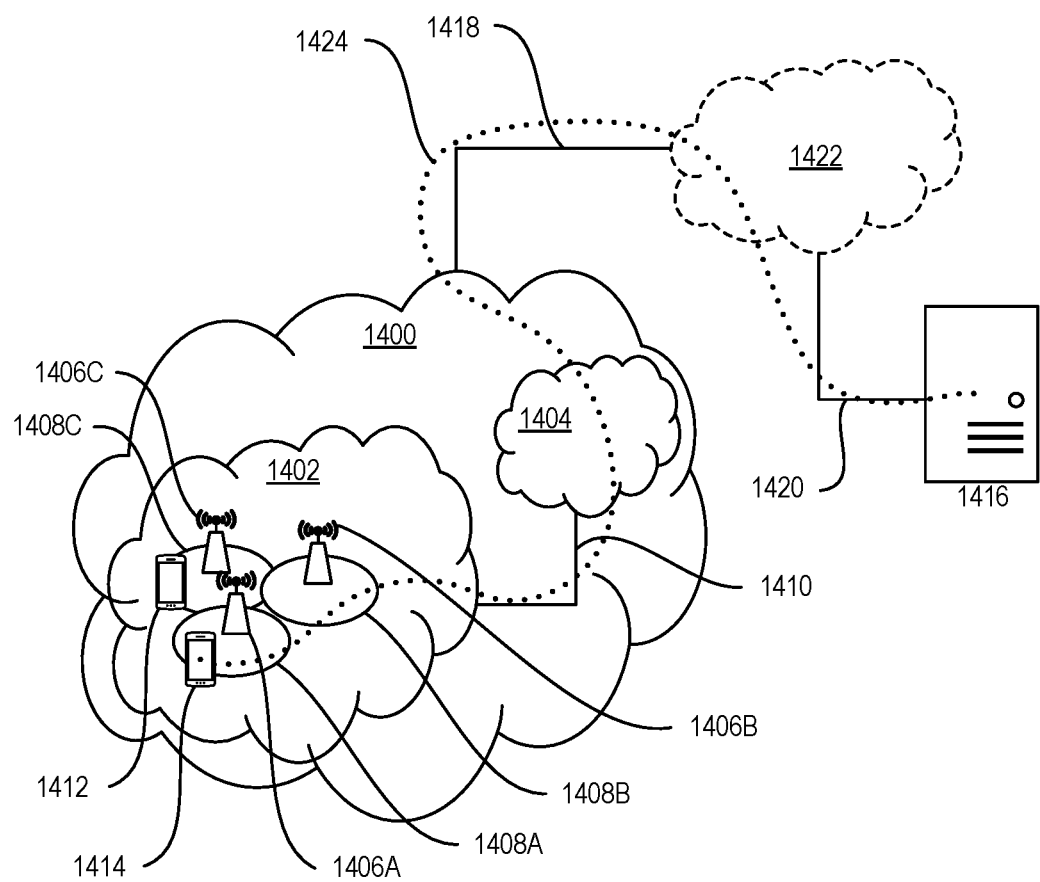
FIG. 14 illustrates a communication system including a telecommunication network, which comprises an access network and a core network, in which embodiments of the present disclosure may be implemented.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as NBs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
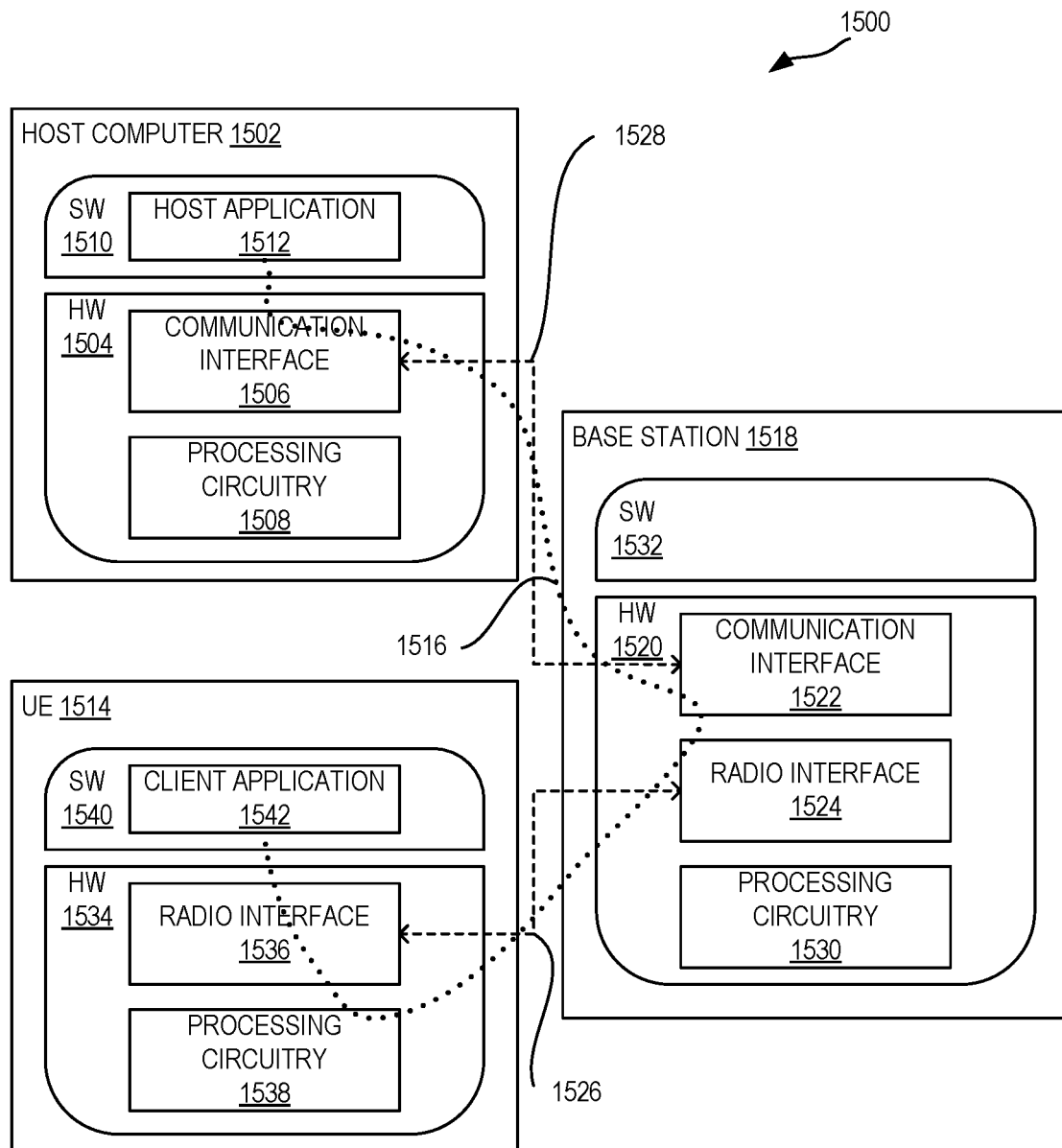
FIG. 15 illustrates example implementations, in accordance with an embodiment, of the UE, base station, and host computer of FIG. 14.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve e.g., data rate, latency, and/or power consumption and thereby provide benefits such as e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless device for communicating with a satellite-based radio access network, the method comprising at least one of: obtaining (802) a value to be used to offset, extend, and/or scale one or more timers related to the satellite-based radio access network relative to values of the one or more timers for non-satellite-based radio access networks; utilizing (804) the value to offset a start of one or more timers to provide one or more offset timers, extend one or more timers to provide one or more extended timers, and/or scale one or more timers to provide one or more scaled timers; and performing (806) one or more actions based on the one or more offset timers, the one or more extended timers, and/or the one or more scaled timers.

Embodiment 2: The method of embodiment 1 wherein utilizing (804) the value comprises offsetting a start of one or more timers to provide the one or more offset timers, and performing (806) the one or more actions comprises performing one or more actions based on the one or more offset timers.

Embodiment 3: The method of embodiment 2 wherein offsetting the start of one or more timers comprises offsetting a start of a timer that defines a random access response window for a random access procedure, and performing one or more actions based on the one or more offset timers comprises monitoring for a random access response during the random access window.

Embodiment 4: The method of embodiment 2 wherein offsetting the start of one or more timers comprises offsetting a start of a timer that defines a contention resolution window for a random access procedure, and performing one or more actions based on the one or more offset timers comprises monitoring for a contention resolution message during the contention resolution window.

Embodiment 5: The method of embodiment 1 wherein utilizing (804) the value comprises extending one or more timers to provide the one or more extended timers, and performing (806) the one or more actions comprises performing one or more actions based on the one or more extended timers.

Embodiment 6: The method of embodiment 5 wherein extending one or more timers to provide the one or more extended timers comprises extending a HARQ RU timer to provide an extended HARQ RU timer, and performing one or more actions based on the one or more extended timers comprises performing a HARQ procedure based on the extended HARQ RU timer.

Embodiment 7: The method of embodiment 5 wherein extending one or more timers to provide the one or more extended timers comprises extending a scheduling request prohibit time timer to provide an extended scheduling request prohibit timer, and performing one or more actions based on the one or more extended timers comprises at least one of: sending a scheduling request; starting the extended scheduling request prohibit timer upon sending the scheduling request; and prohibiting a new scheduling request until the extended scheduling request prohibit timer has expired.

Embodiment 8: The method of embodiment 1 wherein utilizing (804) the value comprises scaling one or more timers to provide the one or more scaled timers, and performing (806) the one or more actions comprises performing one or more actions based on the one or more scaled timers.

Embodiment 9: The method of embodiment 8 wherein scaling one or more timers to provide the one or more scaled timers comprises at least one of: determining a minimum timer value for one or more timers as a function of the value; determining a step size between two timer values for one or more timers as a function of the value; and/or determining a number of supported timer values for one or more timers as a function of the value.

Embodiment 10: The method of embodiment 8 or 9 wherein the one or more scaled timers are one or more scaled RLC timers.

Embodiment 11: The method of any one of embodiments 1 to 10 wherein obtaining the value comprises receiving the value or an adjustment to the value from a base station in the satellite-based radio access network.

Embodiment 12: The method of any one of embodiments 1 to 10 wherein obtaining the value comprises computing the value at the wireless device.

Embodiment 12b: The method of embodiment 1 wherein obtaining (802) the value may comprise one or a combination of the following: receiving (802) the value via system information broadcast from a base station; and/or estimating (802) the value from open loop timing estimates using GPS techniques.

Embodiment 13: The method of any of the previous embodiments, further comprising: providing user data; and forwarding the user data to a host computer via the transmission to the base station.

Group B Embodiments

Embodiment 14: A method performed by a base station for a satellite-based radio access network, the method comprising: sending, to a wireless device, a value or an adjustment to the value to be used to offset, extend, and/or scale one or more timers related to the satellite-based radio access network relative to values of the one or more timers for non-satellite-based radio access networks.

Embodiment 15: The method of any of the previous embodiments, further comprising: obtaining user data; and forwarding the user data to a host computer or a wireless device.

Group C Embodiments

Embodiment 16: A wireless device for communicating with a satellite-based radio access network, the wireless device comprising: processing circuitry configured to perform any of the steps of any of the Group A embodiments; and power supply circuitry configured to supply power to the wireless device.

Embodiment 17: A base station for a satellite-based radio access network, the base station comprising: processing circuitry configured to perform any of the steps of any of the Group B embodiments; and power supply circuitry configured to supply power to the base station.

Embodiment 18: A User Equipment, UE, for communicating with a satellite-based radio access network, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 19: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 20: The communication system of the previous embodiment further including the base station.

Embodiment 21: The communication system of the previous 2 embodiments, further including the UE, wherein the UE is configured to communicate with the base station.

Embodiment 22: The communication system of the previous 3 embodiments, wherein: the processing circuitry of the host computer is configured to execute a host application, thereby providing the user data; and the UE comprises processing circuitry configured to execute a client application associated with the host application.

Embodiment 23: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 24: The method of the previous embodiment, further comprising, at the base station, transmitting the user data.

Embodiment 25: The method of the previous 2 embodiments, wherein the user data is provided at the host computer by executing a host application, the method further comprising, at the UE, executing a client application associated with the host application.

Embodiment 26: A User Equipment, UE, configured to communicate with a base station, the UE comprising a radio interface and processing circuitry configured to perform the method of the previous 3 embodiments.

Embodiment 27: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 28: The communication system of the previous embodiment, wherein the cellular network further includes a base station configured to communicate with the UE.

Embodiment 29: The communication system of the previous 2 embodiments, wherein: the processing circuitry of the host computer is configured to execute a host application, thereby providing the user data; and the UE's processing circuitry is configured to execute a client application associated with the host application.

Embodiment 30: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 31: The method of the previous embodiment, further comprising at the UE, receiving the user data from the base station.

Embodiment 32: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 33: The communication system of the previous embodiment, further including the UE.

Embodiment 34: The communication system of the previous 2 embodiments, further including the base station, wherein the base station comprises a radio interface configured to communicate with the UE and a communication interface configured to forward to the host computer the user data carried by a transmission from the UE to the base station.

Embodiment 35: The communication system of the previous 3 embodiments, wherein: the processing circuitry of the host computer is configured to execute a host application; and the UE's processing circuitry is configured to execute a client application associated with the host application, thereby providing the user data.

Embodiment 36: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 37: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 38: The method of the previous embodiment, further comprising, at the UE, providing the user data to the base station.

Embodiment 39: The method of the previous 2 embodiments, further comprising: at the UE, executing a client application, thereby providing the user data to be transmitted; and at the host computer, executing a host application associated with the client application.

Embodiment 40: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 41: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 42: The communication system of the previous embodiment further including the base station.

Embodiment 43: The communication system of the previous 2 embodiments, further including the UE, wherein the UE is configured to communicate with the base station.

Embodiment 44: The communication system of the previous 3 embodiments, wherein: the processing circuitry of the host computer is configured to execute a host application; and the UE is configured to execute a client application associated with the host application, thereby providing the user data to be received by the host computer.

Embodiment 45: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 46: The method of the previous embodiment, further comprising at the base station, receiving the user data from the UE.

Embodiment 47: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
ACK Acknowledgment
AM Acknowledgement Mode
ASIC Application Specific Integrated Circuit
BS Base Station
CE Control Element
CPU Central Processing Unit
DRX Discontinuous Reception
eNB Enhanced or Evolved Node B
FPGA Field Programmable Gate Array
GEO Geostationary Orbit
gNB New Radio Base Station
GPS Global Positioning System
HARQ Hybrid Automatic Repeat Request
HO Handover
IoT Internet of Things
km Kilometer
LEO Low Earth Orbit
LTE Long Term Evolution MAC Medium Access Control
MEO Medium Earth Orbit
MME Mobility Management Entity
ms Millisecond
MTC Machine Type Communication
NR New Radio
PDCCH Physical Downlink Control Channel
PDU Protocol Data Unit
P-GW Packet Data Network Gateway
RA Random Access
RAR Random Access Response
RLC Radio Link Control
RRC Radio Resource Control
RTT Round Trip Time
SCEF Service Capability Exposure Function
SI System Information
SR Scheduling Request
SSB Synchronization Signal Block
TR Technical Report
UE User Equipment Those skilled in the art will recognize improvements and modifications to the embodiments of the present disclosure. All such improvements and modifications are considered within the scope of the concepts disclosed herein.

REFERENCES

[1] TR 38.811, Study on New Radio (NR) to support non-terrestrial networks
[2] RP-181370, Study on solutions evaluation for NR to support non-terrestrial Network

What is claimed is:

1. A method performed by a wireless device for communicating with a satellite-based radio access network, the method comprising:
obtaining a value to be used to offset, extend, and/or scale one or more timers related to the satellite-based radio access network relative to values of the one or more timers for non-satellite-based radio access networks;
utilizing the value to scale one or more timers to provide one or more scaled timers and to offset a start of one or more timers to provide one or more offset timers or extend one or more timers to provide one or more extended timers, wherein utilizing the value to scale one or more timers to provide the one or more scaled timers comprises determining a step size between two timer values for one or more timers as a function of the value; and
performing one or more actions based on the one or more offset timers, the one or more extended timers, and/or the one or more scaled timers.

2. The method of claim 1 wherein utilizing the value comprises utilizing the value to offset a start of one or more timers to provide the one or more offset timers, and performing the one or more actions comprises performing one or more actions based on the one or more offset timers.

3. The method of claim 2 wherein utilizing the value to offset the start of one or more timers comprises utilizing the value to offset a start of a timer that defines a random access response window for a random access procedure, and performing one or more actions based on the one or more offset timers comprises monitoring for a random access response during the random access response window.

4. The method of claim 2 wherein utilizing the value to offset the start of one or more timers comprises utilizing the value to offset a start of a timer that defines a contention resolution window for a random access procedure, and performing one or more actions based on the one or more offset timers comprises monitoring for a contention resolution message during the contention resolution window.

5. The method of claim 1 wherein utilizing the value comprises utilizing the value to extend one or more timers to provide the one or more extended timers, and performing the one or more actions comprises performing one or more actions based on the one or more extended timers.

6. The method of claim 5 wherein utilizing the value to extend one or more timers to provide the one or more extended timers comprises utilizing the value to extend a Hybrid Automatic Repeat Request, HARQ, Round Trip Time, RTT, timer to provide an extended HARQ RTT timer, and performing one or more actions based on the one or more extended timers comprises performing a HARQ procedure based on the extended HARQ RTT timer.

7. The method of claim 5 wherein utilizing the value to extend one or more timers to provide the one or more extended timers comprises utilizing the value to extend a scheduling request prohibit time timer to provide an extended scheduling request prohibit timer, and performing one or more actions based on the one or more extended timers comprises:
sending a scheduling request;
starting the extended scheduling request prohibit timer upon sending the scheduling request; and
prohibiting a new scheduling request until the extended scheduling request prohibit timer has expired.

8. The method of claim 1 wherein utilizing the value comprises utilizing the value to scale one or more timers to provide the one or more scaled timers, and performing the one or more actions comprises performing one or more actions based on the one or more scaled timers.

9. The method of claim 8 wherein utilizing the value to scale one or more timers to provide the one or more scaled timers further comprises:
determining a minimum timer value for one or more timers as a function of the value; and/or
determining a number of supported timer values for one or more timers as a function of the value.

10. The method of claim 8 wherein the one or more scaled timers are one or more scaled Radio Link Control, RLC, timers.

11. The method of claim 1 wherein obtaining the value comprises receiving the value or an adjustment to the value from a base station in the satellite-based radio access network.

12. The method of claim 11 wherein receiving the value or the adjustment to the value from the base station via Radio Resource Control, RRC, signaling or Medium Access Control, MAC, signaling.

13. The method of claim 1 wherein obtaining the value comprises computing the value at the wireless device.

14. The method of claim 1 wherein obtaining the value comprises:
receiving the value via system information broadcast from a base station; and/or
estimating the value from open loop timing estimates using Global Positioning System, GPS, techniques.

15. A method performed by a base station for a satellite-based radio access network, the method comprising:
sending, to a wireless device, a value or an adjustment to the value to be used to scale and to offset or extend one or more timers related to the satellite-based radio access network relative to values of the one or more timers for non-satellite-based radio access networks, wherein utilizing the value to scale one or more timers to provide the one or more scaled timers comprises determining a step size between two timer values for one or more timers as a function of the value.

16. The method of claim 15 wherein the one or more timers comprise a timer that defines a size of a random access response window.

17. The method of claim 15 wherein the one or more timers comprise a timer that defines a contention resolution window for a random access procedure.

18. The method of claim 15 wherein the one or more timers comprise a Hybrid Automatic Repeat Request, HARQ, Round Trip Time, RTT, timer.

19. The method of claim 15 wherein the one or more timers comprise a scheduling request prohibit timer.

20. The method of claim 15 wherein sending the value or the adjustment to the value to the wireless device comprises broadcasting system information that comprises the value.

21. The method of claim 15 wherein sending the value or the adjustment to the value to the wireless device comprises sending the value or the adjustment to the value to the wireless device during a random access procedure.

22. The method of claim 15 wherein sending the value or the adjustment to the value to the wireless device comprises sending the value or the adjustment to the value to the wireless device when the wireless device is in a connected state.

23. The method of claim 15 wherein sending the value or the adjustment to the value to the wireless device comprises sending the value or the adjustment to the value to the wireless device via Radio Resource Control, RRC, signaling or Medium Access Control, MAC, signaling.

24. A wireless device for communicating with a satellite-based radio access network, the wireless device comprising:

one or more transmitters;
one or more receivers; and
processing circuitry associated with the one or more transmitters and the one or more receivers, the processing circuitry configured to cause the wireless device to:
  obtain a value to be used to offset, extend, and/or scale one or more timers related to the satellite-based radio access network relative to values of the one or more timers for non-satellite-based radio access networks;
  utilize the value to scale one or more timers to provide one or more scaled timers and to offset a start of one or more timers to provide one or more offset timers or extend one or more timers to provide one or more extended timers, wherein utilizing the value to scale one or more timers to provide the one or more scaled timers comprises determining a step size between two timer values for one or more timers as a function of the value; and
  perform one or more actions based on the one or more offset timers, the one or more extended timers, and/or the one or more scaled timers.

25. A base station for a satellite-based radio access network, the base station comprising:
processing circuitry configured to cause the base station to send, to a wireless device, a value or an adjustment to the value to be used to scale and to offset or extend one or more timers related to the satellite-based radio access network relative to values of the one or more timers for non-satellite-based radio access networks, wherein utilizing the value to scale one or more timers to provide the one or more scaled timers comprises determining a step size between two timer values for one or more timers as a function of the value.

* * * * *